United States Patent
Kimura et al.

(10) Patent No.: US 8,467,930 B2
(45) Date of Patent: Jun. 18, 2013

(54) DRIVING MODE CHANGING DEVICE

(75) Inventors: Tamon Kimura, Utsunomiya (JP); Shinichi Inagawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/703,377

(22) Filed: Feb. 10, 2010

(65) Prior Publication Data

US 2010/0211254 A1    Aug. 19, 2010

(30) Foreign Application Priority Data

Feb. 17, 2009 (JP) ................................. 2009-034010

(51) Int. Cl.
*G06F 7/00* (2006.01)
(52) U.S. Cl.
USPC ...................... 701/31.4; 701/1; 701/54; 477/3
(58) Field of Classification Search
None
See application file for complete search history.

(56) References Cited

U.S. PATENT DOCUMENTS

| | | | | |
|---|---|---|---|---|
| 5,005,663 | A * | 4/1991 | Niide et al. ................... | 180/247 |
| 2003/0200016 | A1* | 10/2003 | Spillane et al. ................. | 701/36 |
| 2005/0019173 | A1* | 1/2005 | Wakitani et al. .............. | 417/313 |
| 2007/0271026 | A1* | 11/2007 | Hijikata ........................ | 701/103 |
| 2008/0179126 | A1* | 7/2008 | Unno et al. ................... | 180/230 |

FOREIGN PATENT DOCUMENTS

| | | |
|---|---|---|
| JP | 02-042320 | 3/1990 |
| JP | 05-203020 | 8/1993 |
| JP | 2003-115241 | 4/2003 |
| JP | 2003-341376 | 12/2003 |
| JP | 2005-219698 | * 5/2005 |
| JP | 2007-298018 | 11/2007 |

* cited by examiner

*Primary Examiner* — M. Thein
(74) *Attorney, Agent, or Firm* — Rankin, Hill & Clark LLP

(57) ABSTRACT

The present invention provides a driving mode changing device. The driving mode changing device includes a storage unit for storing three or more driving modes including a normal mode and other modes, an input unit for selecting and inputting an arbitrary one from among the driving modes, and a control unit for changing setup of a plurality of driving control devices installed in a vehicle according to the driving mode input from the input unit. The input unit includes one operating member. The operating member is biased from a stationary position when no operation is performed so as to enable a push operation, and simultaneously biased from the stationary position to a predetermined turned position so as to enable a turn operation. The control unit switches the drive mode from the normal mode to a predetermined driving mode, which is different from the normal mode, among the driving modes when detecting that the operating member is pushed at the stationary position, and switches to the other driving mode different from the normal mode and the predetermined driving mode when detecting that the operating member is continuously held at the turned position for a predetermined time in the state where the predetermined driving mode is selected.

2 Claims, 10 Drawing Sheets

DRIVING MODE CHANGING DEVICE

BACKGROUND OF THE INVENTION

Priority is claimed on Japanese Patent Application No. 2009-034010, filed Feb. 17, 2009, the contents of which are incorporated herein by reference.

FIELD OF THE INVENTION

The present invention relates to a driving mode changing device which changes the driving mode of a vehicle.

DESCRIPTION OF THE RELATED ART

Previously, it is known that some vehicles such as automobiles are equipped with a driving mode changing device capable of changing between a variety of driving modes such as a normal mode or a sports mode. Such a driving mode changing device may include an operation unit that makes it possible to select any one of a save mode, a normal mode, and a power mode as the driving mode (e.g. see Japanese Patent No. 3872507). In this changing device, for example, the save mode is selected as the driving mode by a push operation of this operation unit, the normal mode is selected by a right-turn operation of this operation unit, and the power mode is selected by a left-turn operation of this operation unit.

High-performance and sports-oriented vehicles having a driving mode of conducting high acceleration (launch mode) at the start of the circuit travel, have been developed in recent years. In the case where an automobile having a driving mode such as the launch mode in which a great change in acceleration, etc. occurs suddenly as compared to the normal mode, it is necessary to prevent the driving mode from being switched to a mode which a driver does not want due to misoperation, etc. of the operation unit. However, in the aforementioned driving mode switching device, since the mode switching is carried out by a simple push operation or turn operation of the operation unit, there is a possibility that the mode conducting sudden acceleration may be selected unintentionally.

Further, a method of allocating only a function of selecting the sudden acceleration mode using an individual switch has been taken into consideration, but there are problems in that the number of parts increases, and simultaneously the selection operation is complex and thus troublesome.

SUMMARY OF THE INVENTION

This invention has been made in view of the above circumstances, and it is an object of the present invention to provide a driving mode changing device capable of inhibiting an increase in the number of parts and a complication of selection operation, and preventing misoperation.

In order to solve the above problems and accomplish the related object, the present invention employs the followings.

(1) A driving mode switching device of the present invention includes a storage device for storing three or more driving modes including a normal mode and other modes, an input device for selecting and inputting an arbitrary one from among the driving modes, and a control device for changing the setup of a plurality of driving control device installed in a vehicle according to the driving mode input from the input device. The input device includes one operating member. The operating member is biased from a stationary position when no operation is performed so as to enable a push operation, and simultaneously biased from the stationary position to a predetermined turned position so as to enable a turn operation. The control device switches to a predetermined driving mode, which is different from the normal mode, among the driving modes when detecting that the operating member is pushed at the stationary position, and switches to the other driving mode different from the normal mode and the predetermined driving mode when detecting that the operating member is continuously held at the turned position for a predetermined time in the state where the predetermined driving mode is selected.

According to the driving mode changing device recited in the above (1), the operation of switching from the normal mode to the predetermined driving mode is the push operation, whereas the operation of switching from the normal mode or predetermined driving mode to the other driving mode is a combination of the turn operation and the holding operation. In this manner, the switching methods of the driving modes are assigned respective operation techniques that are completely different from each other, so that misoperation occurring when the driving modes are switched can be reliably prevented. For example, when the driving mode having a great change in acceleration, etc. compared to the normal mode is assigned as the other driving mode, it is possible to reliably prevent the other driving mode from being selected unintentionally and thus unexpected vehicle behavior can be prevented.

Further, when switching to the other driving mode, a holding operation lasting for a predetermined time is required, thereby allowing driver to recognize that the operation of switching to the other driving mode is a special driving mode of performing, for instance, sudden acceleration.

(2) In the driving mode changing device according to the above (1), the driving mode switching device may further include a display device capable of displaying an operation state of the input device. The display device may display a residual time from when the operating member of the input device is operated to the turned position to when the switching to the other driving mode is performed.

According to the driving mode changing device recited in the above (2), in addition to the effects obtained by the driving mode switching device recited in the above (1), the driver can visualize a residual time until the switching to the other driving mode is performed in real time. As such, it is possible to further reduce the possibility of misoperation and improve the presentation.

(3) In the driving mode changing device according to the above (2), the display device may be installed on an instrument panel having instruments of the vehicle. The instrument panel may include an illuminating device that illuminates the instruments. The illuminating device may be varied to an illumination color different to that before changing to the predetermined driving mode, when changing to the predetermined driving mode.

According to the driving mode changing device recited in the above (3), in addition to the effects obtained by the driving mode changing device recited in the above (2), the result of the driving mode changing can be immediately seen by the illumination color of the illuminating device of the instrument panel, so that it is possible to still further improve the presentation effect of the driving mode changing.

Further, it is easy for the driver to recognize a state that the operation input of the other driving mode is received.

DETAILED DESCRIPTION OF THE INVENTION

Hereinafter, a driving mode changing device according to one embodiment of the present invention will be described with reference to the accompanying drawings.

Figure 1:
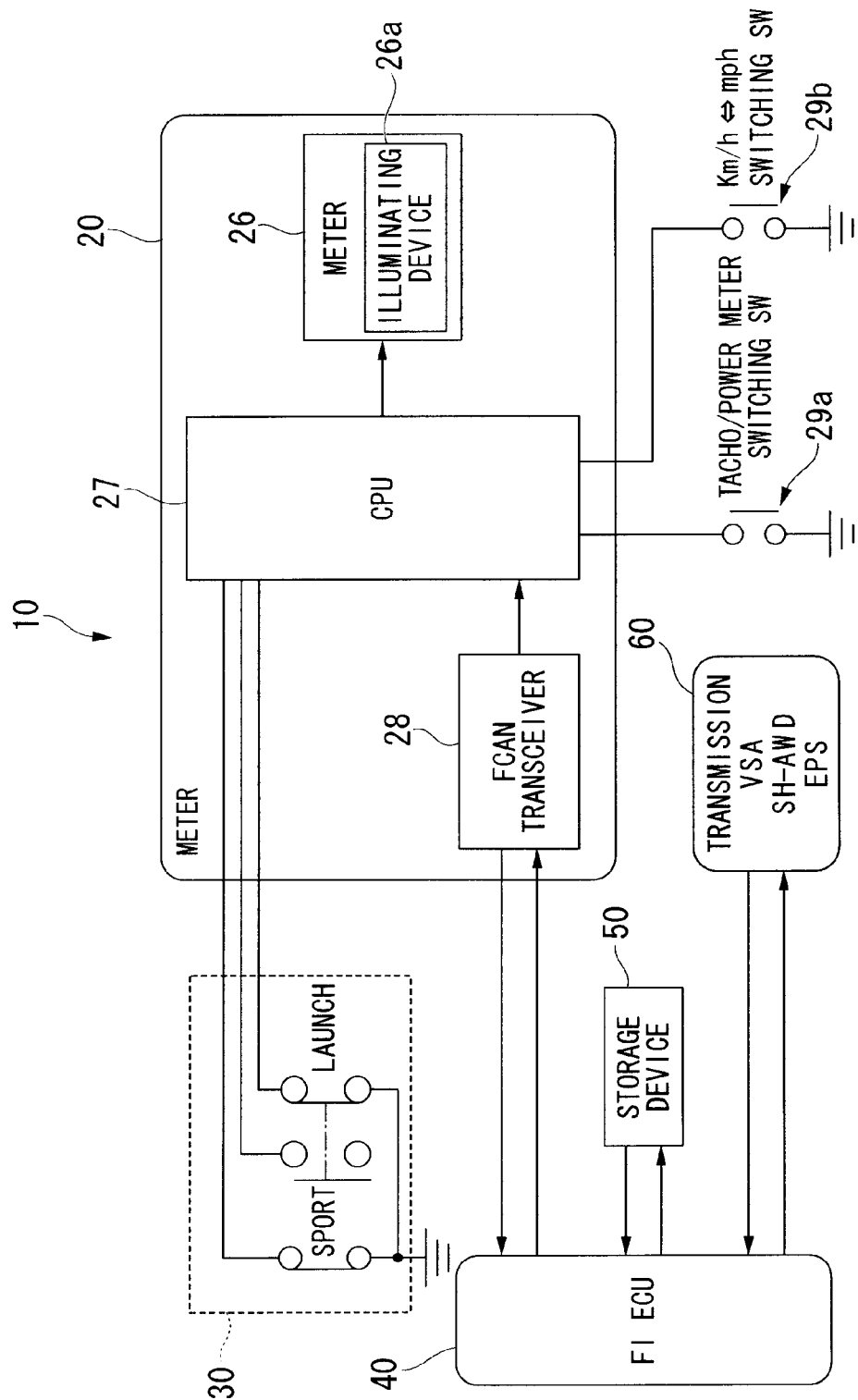
FIG. 1 is a block diagram showing a schematic configuration of a driving mode changing device according to one embodiment of the present invention.
Figure 2:
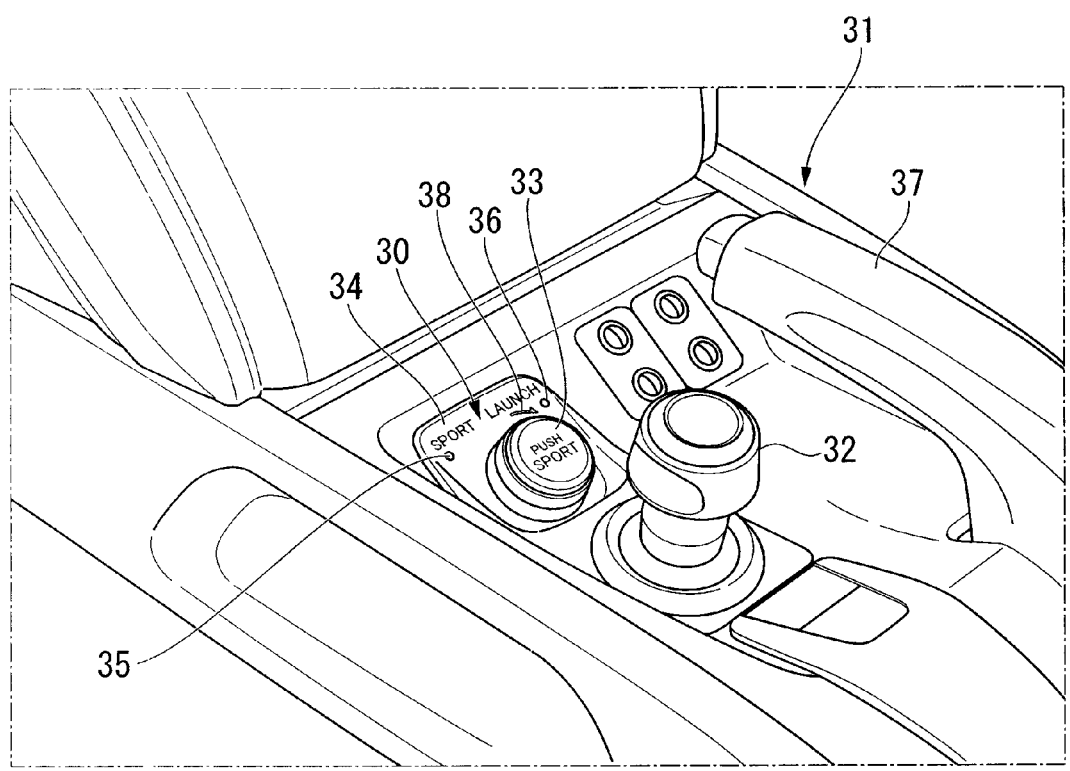
FIG. 2 is a perspective view of the mode changing switch according to the same embodiment.

FIG. 1 shows a schematic configuration of a driving mode changing device 10 according to the present embodiment. FIG. 2 is a perspective view showing an example where a mode changing switch 30 of the driving mode changing device 10 of the same embodiment is installed.

The driving mode changing device 10 includes a meter unit (instrument panel) 20, a mode changing switch (input device) 30, a fuel injection electronic control unit (FIECU) (control device) 40, a storage device 50, and various driving control units (driving control devices) 60 of a vehicle.

Figure 5B:
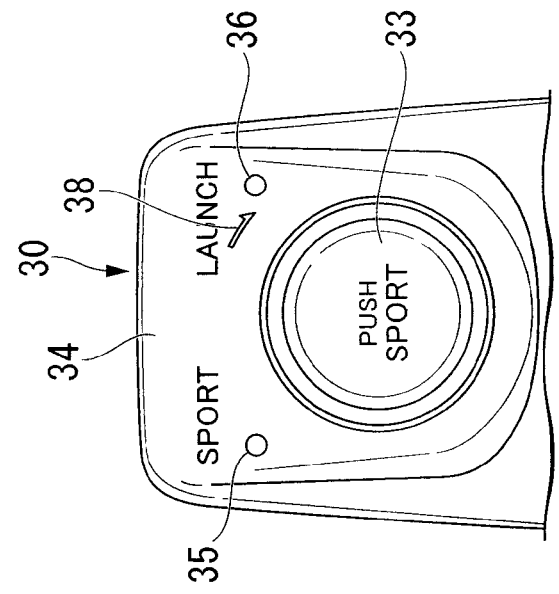
FIG. 5B shows the state of a mode changing switch in a normal mode according to the same embodiment.
Figure 5A:
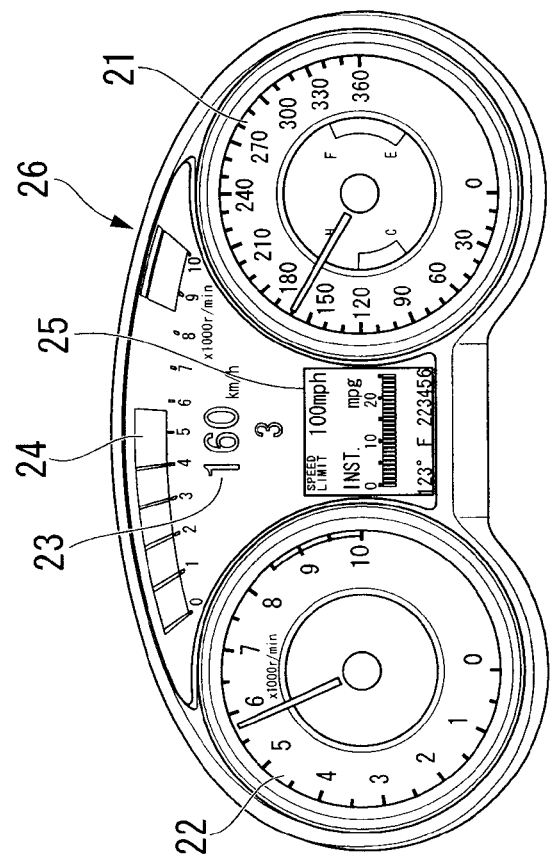
FIG. 5A shows the state of a meter in a normal mode according to the same embodiment.

The meter unit 20 is disposed in an instrument panel in front of a driver's seat. As shown in FIG. 5A, this meter unit 20 includes a meter 26 having an analog tachometer 21; an analog revolution counter 22; a digital display part 23; a bar graph 24; and a multi-information display (MID) (display device) 25 enabling various pieces of information to be displayed through, for instance, liquid crystal. Moreover, the meter unit 20, as shown in FIG. 1, includes a central processing unit (CPU) 27, which controls operation of the meter 26 on the basis of an input signal from the outside of the meter unit 20.

The CPU 27 is connected with a full controller area network (FCAN) transceiver 28. Mode information associated with the driving mode (to be described below) of the vehicle currently selected is input from the FIECU 40 into the CPU 27 via the FCAN transceiver 28. Further, the CPU 27 is connected with the mode changing switch 30, which is an input device for changing the driving mode of the vehicle. The result of operating this mode changing switch 30 is input into the CPU 27. Further, the CPU 27 is connected with two changing switches (SWs) 29a and 29b installed on, for example, a spoke of a steering wheel.

The CPU 27 controls operation of the meter 26 of the meter unit 20 on the basis of the mode information input from the FIECU 40. More specifically, a stepping motor that drives indicators of the analog tachometer 21 and the analog revolution counter 22 is driven by the CPU 27 via a drive circuit that is not shown. Further, the CPU 27 controls changing of the illumination color of an illuminating device 26a (see FIG. 1), which illuminates the digital display part 23 and controls display contents of the multi-information display 25 in accordance with the driving mode of the vehicle.

Further, the CPU 27 controls switching of the unit of a vehicle speed, which is displayed on the digital display part 23, between km/h and mph as well as switching of a target, which is indicated on the bar graph 24, between engine revolutions per minute Ne, ×1000 r/min, and power (e.g. ps or kw), according to input operation of the switching SWs 29a and 29b.

Here, in the driving mode changing device 10 of the present embodiment, a normal mode, which is used during normal travel, a sports mode, in which an axle response or a speed change response is more crucial than in the normal mode and thus the engine uses up to a high revolution range, and a launch mode, in which sudden acceleration is performed at the time of circuit travel, are set to be previously switched as the driving mode. The aforementioned illuminating device 26a changes the illumination color into, for example, white when the driving mode is the normal mode and a special color, for instance red, when the driving mode is the sports mode or the launch mode. Thus, in the case of the launch mode is selected, the multi-information display 25 is controlled as a special display such that its background is displayed in orange, and words are displayed in black.

The FCAN transceiver 28 is a communicating device for transceiving various pieces of information via an FCAN that is a relatively high-speed in-vehicle network disposed in the vehicle. This FCAN is connected with either various control devices, such as the FIECU 40, controlling the fuel injector of an internal combustion engine, or sensors, and decodes a received signal to output the decoded signal to the CPU 27. For the convenience of description, it is shown in FIG. 1 that the connection between the FCAN transceiver 28 and the FIECU 40, and connection between the FIECU 40 and the various driving control units 60 is made individually. However, such connections are made through a common FCAN.

The mode changing switch 30 is an input device for changing and selecting one from among the multiple driving modes including the normal mode, the sports mode, and the launch mode. This mode changing switch 30 is disposed on a front side of the vehicle as compared to a shift lever 32 (see FIG. 2) on a center console 31 that is interposed between a driver seat and a front passenger seat. The arrangement of the mode changing switch 30 shown in FIG. 2 corresponds to an example of a left-hand drive car, and a lever 37 of a parking brake extends to the right side of the shift lever 32. In the case of a right-hand drive car, the parking brake lever 37 extends to the left side of the shift lever 32.

The mode changing switch 30 includes: an approximately cylindrical operating member 33, which protrudes with its axis inclined from above the vehicle slightly to the rear; and a main body 34, which supports the side of a base part of the operating member 33 and has a sports-mode light emitting diode (LED) 35 turned on when the sports mode is selected and a launch-mode LED 36 turned on when the launch mode is selected.

Figure 3:
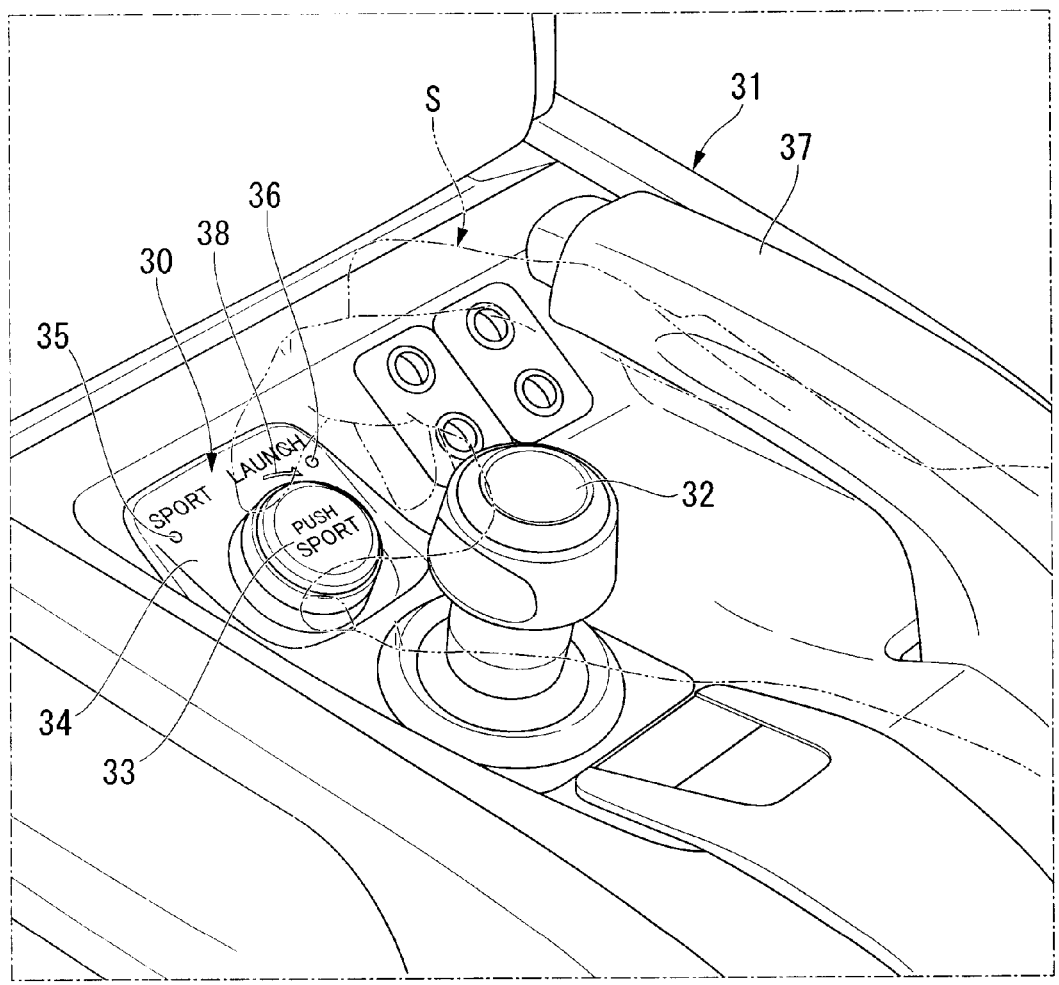
FIG. 3 is a perspective view showing arrangement of the mode changing switch according to the same embodiment, a shift knob, and an operating hand.

As shown in FIG. 3, the operating member 33 is disposed adjacent to the vehicle front side of the shift lever 32. Thereby, in the state where an operating hand S of a driver grasps the shift lever 32 from above, the hand S is able to rapidly and smoothly move to an operating position of each of the push and turn operations of the operating member 33. Moreover, the operating member 33 is disposed at a position where, in the state where the upper portion of an approximately cylindrical sidewall of the operating member 33 is grasped by the thumb and index finger of the driver, a predetermined clearance is secured between the palm and the shift lever 32 such that the palm of the driver does not interfere with the shift lever 32.

The operating member 33 is formed so as to be able to be displaced from a stationary position, which is a position where no operation is performed, into a pushing direction, and simultaneously to be rotated from the stationary position in a clockwise direction. Further, the operating member 33 is biased in a protruding direction and in a counterclockwise direction by an elastic body such as a coil spring so as to return to the stationary position when no operation is performed. An arrow 38, which points to the direction where the aforementioned turn operation is possible, is attached to an upper surface of the main body 34 in the vicinity of the launch-mode LED 36.

Furthermore, when the operating member 33 is pushed and displaced to a pushed position, the operating member 33 is restricted from being displaced in its turning direction, and thus is allowed to be displaced only in the pushing direction. Meanwhile, when the operating member 33 is turned and displaced to the turned position, the displacement in the pushing direction is restricted.

When the aforementioned operating member 33 is displaced from the stationary position to the pushed position, the mode changing switch 30 outputs a contact signal for the push operation to the CPU 27. Meanwhile, when the operating member 33 is displaced from the stationary position to the turned position, the mode changing switch 30 outputs a contact signal for the turn operation to the CPU 27. The contact signal for the turn operation is configured by combining a normally open contact and a normally closed contact in order to prevent faulty detection caused by an ON failure. Only when an AND condition of the normally open contact ON and the normally closed contact OFF is satisfied, the turn operation of the operating member 33 is detected by the CPU 27.

The FIECU 40 is a control device that controls the fuel injector of an internal combustion engine. This FIECU 40 is connected, through an FCAN, with the other electronic control devices installed in the vehicle, for instance the various driving control units 60 of the vehicle, and various sensors such as a wheel speed sensor detecting the vehicle speed, an rpm sensor detecting the engine revolutions per minute Ne, a steering angle sensor detecting a steering angle, a gradient sensor detecting a road gradient, an accelerator pedal sensor, a brake pedal sensor, a transmission oil sensor, a water temperature sensor detecting a cooling water temperature of an engine (ENG), and a sensor detecting a shift position. Thus, the FIECU 40 outputs information about the display contents of the meter unit 20 to the CPU 27 on the basis of input information from the sensors.

Furthermore, the FIECU 40 determines a transition permission condition for transition to the sports mode and a transition permission condition for transition to the launch mode according to the result of the mode changing switch 30 changing and selecting the driving mode and the status flag output from the various driving control units 60. When the FIECU 40 determines that a predetermined transition permission condition is satisfied, the FIECU 40 searches for a corresponding driving mode from each of the driving modes (normal mode, sports mode, and launch mode) information that pre-stored in the storage device 50, and performs changing to the corresponding driving mode. In detail, when the driving mode is switched, the FIECU 40 sends the mode information about the driving mode to the CPU 27 through the FCAN and FCAN transceiver 28. Moreover, the FIECU 40 acquires mode transition information, which is stored in connection with the driving mode information about the switched driving mode, from the storage device 50, and sends this mode transition information to the various driving control units 60. Thereby, in the various driving control units 60, the control is carried out based on the changed driving mode.

The storage device 50 is a storage medium comprising of a non-volatile memory, a magneto-optical disk, or the like. This storage device 50 pre-stores the mode transition information including control contents of the various driving control units 60 associated with the multiple driving modes including the normal mode, sports mode, and launch mode. The storage device 50 outputs the mode transition information associated with each driving mode to the FIECU 40 according to a control instruction input from the FIECU 40.

The various driving control units 60 carry out the control associated with the driving of the vehicle. The various driving control units 60 include driving control units such as a transmission, a vehicle stability assist (VSA) (vehicle behavior stabilization control system) controlling disturbance of the vehicle, a super handling-all wheel drive (SH-AWD) (four-wheel driving force free control system) freely controlling front and rear wheels and left- and right-hand driving forces of the rear wheels, an electric power steering (EPS) using the driving force of a motor for a power steering assist, and so on. These various driving control units 60 constantly send their own status information to the FIECU 40 as mode transition permission flags. Moreover, when the mode transition information is input from the FIECU 40 into the various driving control units 60, the driving control based on the mode transition information is performed on each of the driving control units 60.

Next, operation, particularly a transition to the launch mode, of the driving mode changing device 10 of the present embodiment will be described with reference to a flowchart of FIG. 4.

Figure 6A:
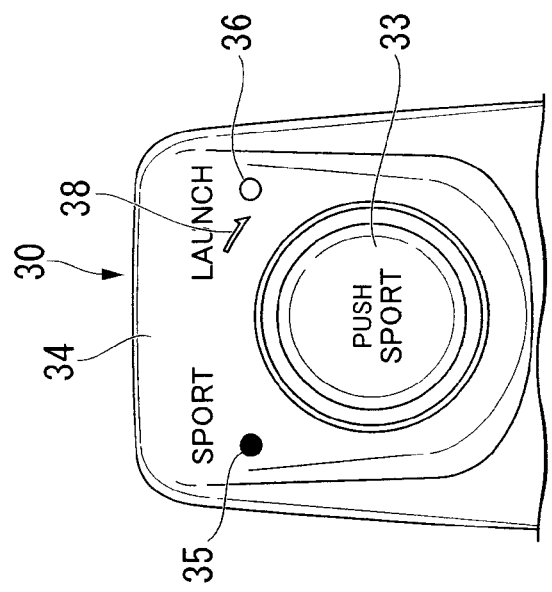
FIG. 6A shows the state of a meter in a sports mode according to the same embodiment.
Figure 6B:
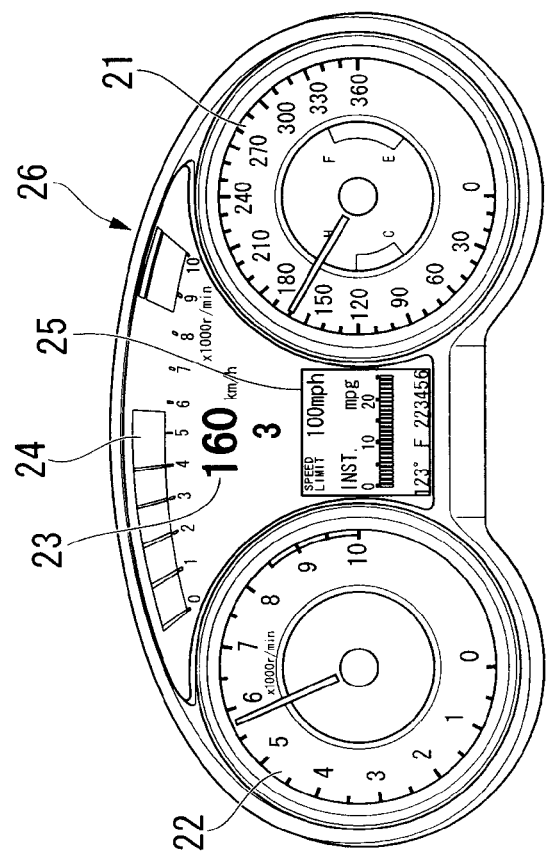
FIG. 6B shows the state of a mode changing switch in a sports mode according to the same embodiment.

Since the transition permission condition for transition to the launch mode includes the state where the driving mode is in the sports mode, first, a transition from the normal mode to the sports mode will be described. As shown in FIG. 5, in the state where the normal mode, the typical driving mode, is selected, and where both the sports-mode LED 35 and the launch-mode LED 36 are turned off, when the push operation of the operating member 33 is performed by a driver, and it is simultaneously determined on the basis of a status flag that the various driving control units 60 show no abnormality, the transition permission condition for transition to the sports mode is satisfied. Then, the transition from the normal mode to the sports mode is made, so that the sports-mode LED 35 is turned on, for instance, in green as shown in FIG. 6B, and the digital display part 23 is displayed from white (see FIG. 5A) to red by the illuminating device 26*a* as shown in FIG. 6A. Meanwhile, when the aforementioned transition permission condition is not satisfied, the normal mode is maintained.

Next, a transition from the sports mode to the launch mode will be described.

Figure 4:
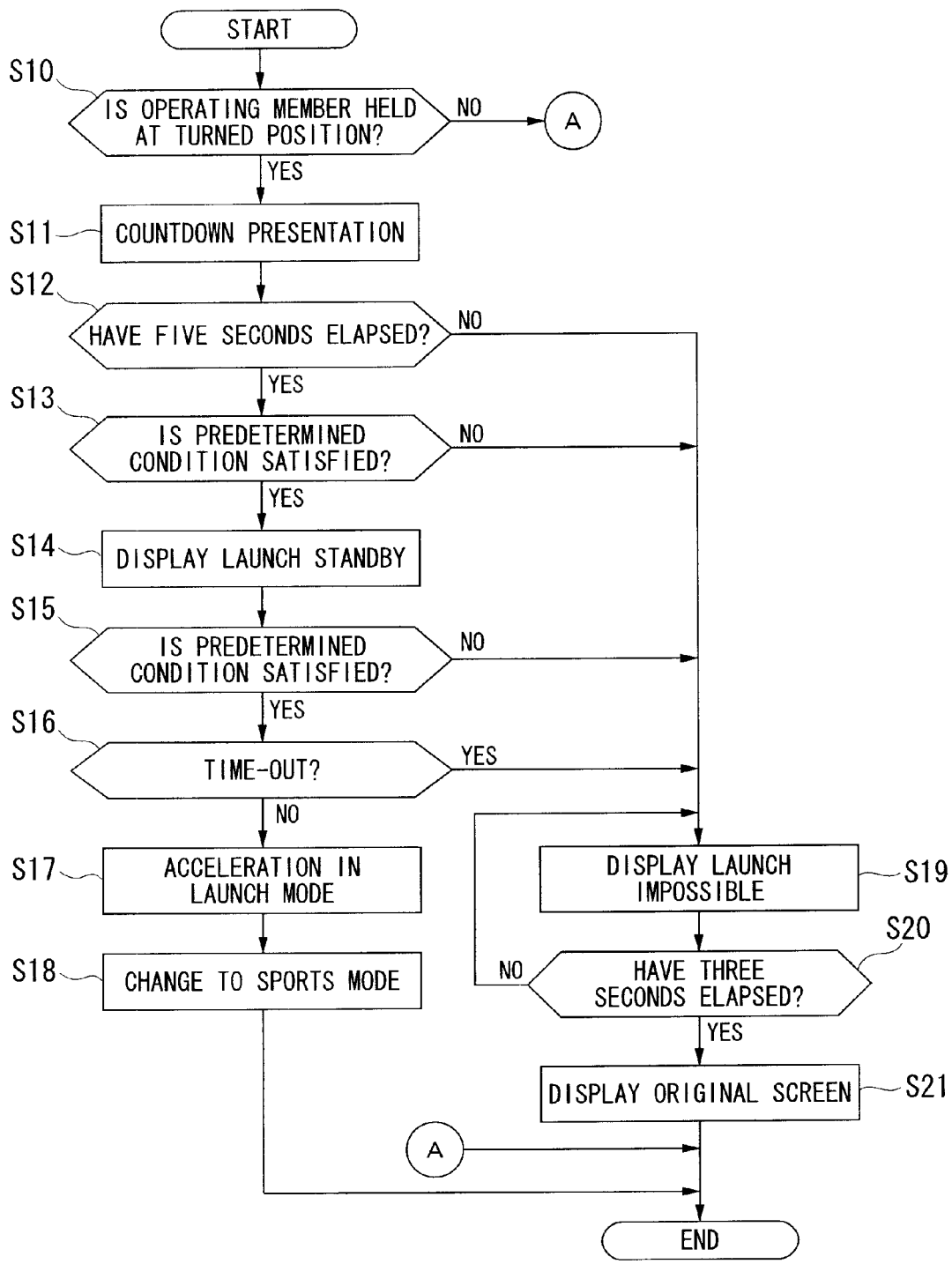
FIG. 4 is a flowchart showing a transition of a driving mode according to the same embodiment.

As shown in the flowchart of FIG. 4, first, in step S10, it is determined whether or not the operating member 33 is held at a turned position.

If the result of the determination in step S10 is "No" (i.e. the operating member 33 is not held at the turned position), the execution of this routine is terminated for the present.

Figure 7A:
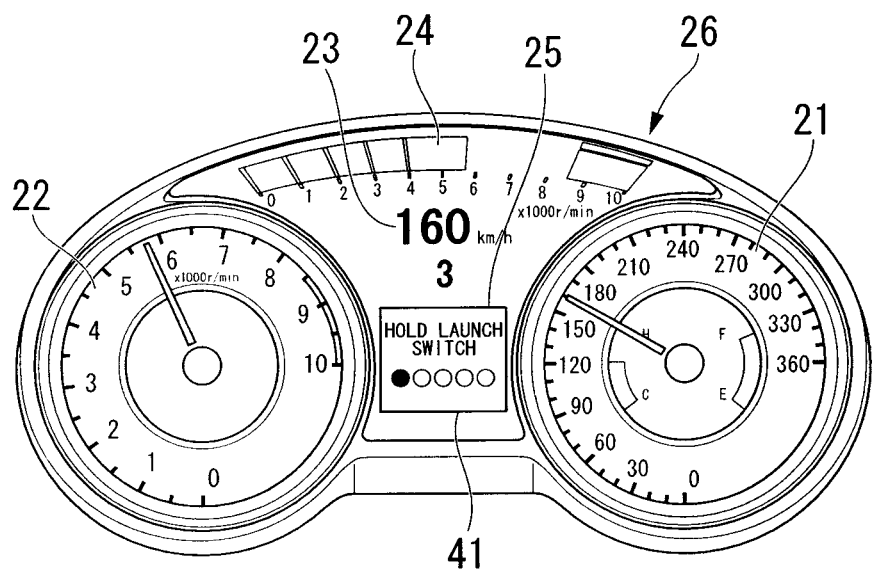
FIG. 7A is a general view of a meter, according to the same embodiment, showing an example where a countdown presentation screen is displayed.
Figure 7B:
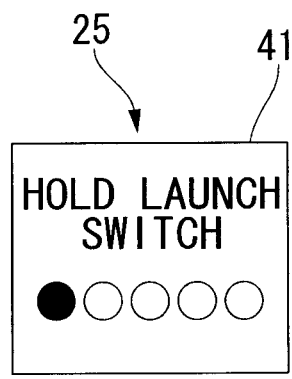
FIG. 7B is an enlarged view of a multi-information display, according to the same embodiment, showing an example where a countdown presentation screen is displayed.

If the result of the determination in step S10 is "Yes" (i.e. the operating member 33 is held at the turned position), it proceeds to step S11. In step S11, for example, while counting down a predetermined time (e.g. five seconds), a countdown presentation screen 41, which displays a message, "HOLD LAUNCH SWITCH," to the effect that the operating member 33 continues to be held at the turned position is displayed on the multi-information display 25 (as shown in FIG. 7B), thereby performing countdown presentation of the launch mode. This countdown presentation screen 41 allows the driver to easily see how much of the predetermined time has elapsed after the operating member 33 has been held at the turned position. FIG. 7B is an enlarged view of the multi-information display 25 showing an example of the countdown presentation screen displayed when the predetermined time is set to five seconds. In this case, five white circles "○" displayed in series on the countdown presentation screen 41 are sequentially changed to black circles "●" whenever one second passes starting from the leftmost among them.

In the flowchart of the present embodiment, the case where the predetermined time is set to five seconds will be described below as one example. However, the predetermined time is not limited to five seconds.

In step S12, it is determined whether or not five seconds have elapsed in the state where the operating member 33 is held at the turned position. If the result of the determination in step S12 is "No" (i.e. the five seconds have not elapsed), it proceeds to step S19. In contrast, if the result of the determination in step S12 is "Yes" (i.e. the five seconds have elapsed), it proceeds to step S13. In step S13, it is determined whether or not a predetermined condition for the launch mode transition is approved on the basis of the mode transition permission flag or the operation information about the operation of the driver which is sent from the driving-related various driving control units 60 mounted on the vehicle. The predetermined condition refers to a preset condition in order to determine the transition permission for transition to the launch mode.

Figure 8A:
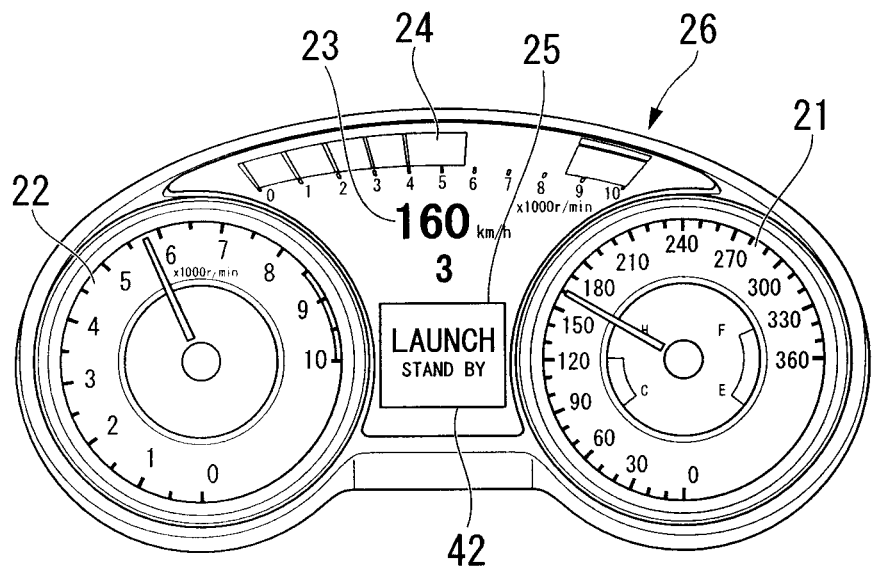
FIG. 8A is a general view of a meter, according to the same embodiment, showing an example where a launch standby screen is displayed.
Figure 8B:
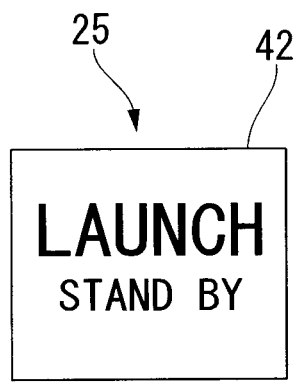
FIG. 8B is an enlarged view of a multi-information display, according to the same embodiment, showing an example where a launch standby screen is displayed.
Figure 9:
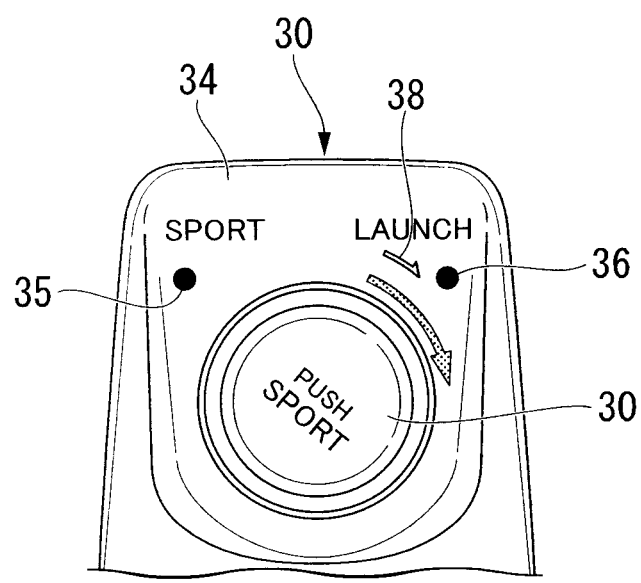
FIG. 9 is a front view of a mode changing switch in a launch mode according to the same embodiment.

If the result of the determination in step 13 is "No" (i.e. the predetermined condition is not satisfied), it proceeds to step S19. In contrast, if the result of the determination in step S13 is "Yes" (i.e. the predetermined condition is satisfied), it proceeds to step S14. In step S14, as shown in FIGS. 8A and 8B, a launch standby screen 42, which includes a message, "LAUNCH STANDBY," to the effect that the driving mode has changed to the launch mode is displayed on the multi-information display 25. At this time, as shown in FIG. 9, the launch-mode LED 36 of the mode changing switch 30 is turned on in a color, for instance red, different from the color of the sports-mode LED 35, i.e. green, and both the sports-mode LED 35 and the launch-mode LED 36 become turned on.

Next, in step S15, it is determined again whether or not the predetermined condition is satisfied. If the result of this determination is "No" (i.e. the predetermined condition is not satisfied), it proceeds to step S19. In contrast, if the result of this determination is "Yes" (i.e. the predetermined condition is satisfied), it proceeds to step S16, and it is determined to have timed out, i.e. whether or not a predetermined time has elapsed after the predetermined condition is satisfied.

If the result of the determination in step S16 is "No" (i.e. the time-out has not occurred), it proceeds to step S17, acceleration control over the launch mode is performed, and it proceeds to step S18.

In step S18, the launch mode is changed to the sports mode under the condition that the acceleration control over the launch mode is completed, and the execution of this routine is terminated for the present.

On the other hand, if the result of the determination in step S16 is "Yes" (i.e. the time-out has occurred), it proceeds to step S19.

Figure 10A:
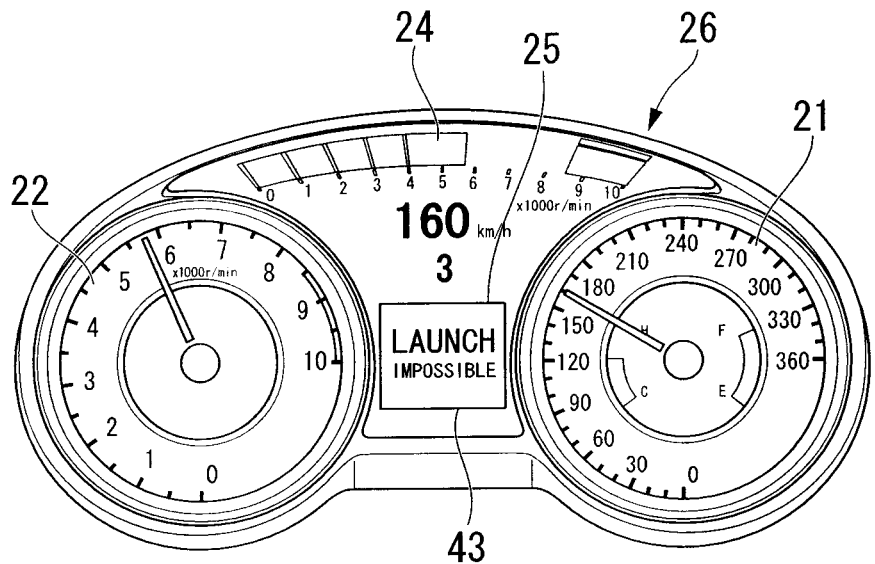
FIG. 10A is a general view of a meter, according to the same embodiment, showing an example where a launch impossible screen is displayed.
Figure 10B:
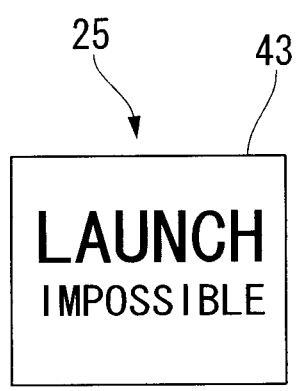
FIG. 10B is an enlarged view of a multi-information display, according to the same embodiment, showing an example where a launch impossible screen is displayed.

In step S19, a launch impossible screen 43, which includes a message, "LAUNCH IMPOSSIBLE," shown in FIGS. 10A and 10B, is displayed on the multi-information display 25, and the driver is notified to the effect that a condition for transition to the launch mode is not arranged.

Next, in step S20, it is determined whether or not three seconds have elapsed after the launch impossible screen 43 has begun to be displayed.

If the result of the determination in step S20 is "No" (i.e. the three seconds have not elapsed), the launch impossible screen 43 continues to be displayed. In contrast, if the result of the determination in step S20 is "Yes" (i.e. the three seconds have elapsed), it proceeds to step S21. In the step S21, the original screen before the turn operation of the operating member 33 was detected in step S10 is displayed, and the execution of the present routine is terminated for the present.

The sports mode is released by pushing the operating member 33 again, and changed to the normal mode. Further, in step S13 described above, if the predetermined condition is not satisfied (or mismatched), an error message related to mismatched items may be displayed on the multi-information display 25, and the driver may be notified thereof.

In the aforementioned embodiment, the operation of changing from the normal mode to the sports mode is the push operation of the operating member, whereas the operation of changing from the sports mode to the launch mode is a combination of the turn operation and holding operation of the operating member. In this manner, the driving mode changing operations are assigned respective operation techniques that are completely different from each other, so that misoperation of changing to each driving mode can be reliably prevented. In particular, when the turn operation is assigned to the operation of changing the driving mode from the sports mode to the launch mode having a great change in acceleration, etc., it is possible to reliably prevent the launch mode from being selected unintentionally and thus unexpected vehicle behavior can be prevented.

Further, when changing to the launch mode, the holding operation of the operating member 33 is required, thereby making it possible to produce a presentation effect of causing the driver to recognize that the operation of changing to the launch mode is a special driving mode of performing, for instance, sudden acceleration.

Furthermore, since the driver can visualize a residual time until the changing to the launch mode is performed in real time through the countdown presentation screen 41, it is possible to further reduce the possibility of misoperation and improve presentation.

Thus, the result of the driving mode changing can be seen in a moment by a change in illumination color caused by the illuminating device 26a of the meter unit 20. Accordingly, it is possible to still further improve presentation of the driving mode changing. Moreover, it becomes easy for the driver to recognize that the operation input of the other driving mode can be received.

Although the aforementioned embodiment has been described regarding the example where the driving modes include the normal mode, the sports mode, and the launch mode, it is not limited to this configuration as far as a plurality of driving modes are provided.

Moreover, while the aforementioned embodiment has been described regarding the example where the illumination colors of the digital display part 23 of the meter 26 are varied by the illuminating device 26a depending on the driving modes, it is not limited to this configuration. For example, the illumination color of the analog tachometer 21, the analog revolution counter 22, or the bar graph 24 may be varied like the digital display part 23. Further, in the case where the normal mode is changed to the sports mode, the configuration in which the illumination color of the illuminating device 26a is varied has been described. However, in the case where the sports mode is changed to the launch mode, the illumination color of the illuminating device 26a may be varied.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving mode changing device comprising:
    a storage device for storing three or more driving modes including a normal mode and other modes;
    an input device for selecting and inputting an arbitrary one from among the driving modes;
    a control device for changing setup of a plurality of driving control devices installed in a vehicle according to the driving mode input from the input device; and
    a display device capable of displaying an operation state of the input device, wherein
    the input device includes one operating member, the operating member being biased from a stationary position when no operation is performed so as to enable a push operation, and simultaneously biased from the stationary position to a predetermined turned position so as to enable a turn operation, and
    the control device switches the driving mode from the normal mode to a predetermined driving mode, which is different from the normal mode, among the driving modes when detecting that the operating member is pushed at the stationary position, and switches to the other driving mode different from the normal mode and the predetermined driving mode when detecting that the operating member is continuously held at the turned position for a predetermined time in a state where the predetermined driving mode is selected, and
    wherein the display device displays a residual time from when the operating member of the input device is operated to the turned position to when the changing to the other driving mode is performed.

2. The driving mode changing device according to claim 1, wherein
    the display device is installed on an instrument panel having instruments of the vehicle,
    the instrument panel includes an illuminating device that illuminates the instruments, and
    an illumination color of the illuminating device is varied to a different color from that before the changing to the predetermined driving mode is performed, when the switching to the predetermined driving mode is performed.

* * * * *